United States Patent [19]
Grochowski et al.

[11] Patent Number: 5,416,913
[45] Date of Patent: May 16, 1995

[54] METHOD AND APPARATUS FOR DEPENDENCY CHECKING IN A MULTI-PIPELINED MICROPROCESSOR

[75] Inventors: Edward T. Grochowski, San Jose; Donald B. Alpert; Ahmad Zaidi, both of Santa Clara, all of Calif.

[73] Assignee: Intel Corporation, Santa Clara, Calif.

[21] Appl. No.: 316,804

[22] Filed: Oct. 3, 1994

Related U.S. Application Data

[63] Continuation of Ser. No. 919,929, Jul. 27, 1992, abandoned.

[51] Int. Cl.⁶ ............................................. G06F 9/40
[52] U.S. Cl. ............................ 395/375; 395/800; 364/230; 364/230.2; 364/262.4; 364/263
[58] Field of Search .................................. 395/375, 800

[56] References Cited
U.S. PATENT DOCUMENTS

| | | |
|---|---|---|
| 4,858,105 | 8/1989 | Kuriyama et al. ................ 395/375 |
| 5,073,855 | 12/1991 | Staplin et al. ..................... 395/375 |
| 5,075,844 | 12/1991 | Jardine et al. .................... 395/375 |
| 5,201,057 | 4/1993 | Uht ................................... 395/800 |
| 5,226,166 | 7/1993 | Ishida et al. ...................... 395/800 |
| 5,233,694 | 8/1993 | Hotta et al. ....................... 395/375 |
| 5,241,636 | 8/1993 | Kohn ................................. 395/375 |
| 5,355,460 | 10/1994 | Eickemeyer et al. ............. 395/375 |

*Primary Examiner*—Parshuiam S. Lall
*Assistant Examiner*—Brian Ledell
*Attorney, Agent, or Firm*—Blakely, Sokoloff, Taylor & Zafman

[57] ABSTRACT

In a superscalar processor capable of executing two integer instructions in parallel, an array of comparators is provided to check for all combinations of register dependency between a pair of sequential program instructions. Additional logic is provided to validate the register fields of the instructions. If no impermissible dependencies are detected and all register fields are valid, the instructions are issued and executed in parallel. Otherwise, the instructions are executed sequentially.

3 Claims, 3 Drawing Sheets

METHOD AND APPARATUS FOR DEPENDENCY CHECKING IN A MULTI-PIPELINED MICROPROCESSOR

This is a continuation of application Ser. No. 07/919,929, filed Jul. 27, 1992, now abandoned.

FIELD OF THE INVENTION

The present invention relates generally to the field of microprocessor architecture, and in particular to a method and apparatus for checking dependencies between instructions to be executed in parallel pipelines of a superscalar machine.

BACKGROUND OF THE INVENTION

Computers have historically been designed to execute instructions sequentially; that is, one after another. While sequential execution of computer instructions does provide a logical and orderly method of operation, the ever-present demand to increase processing speed has led to the development of computers that implement parallel execution of instructions. One category of such computers is referred to as a superscalar machine in which parallel instruction pipelines provide the ability to execute a plurality of instructions simultaneously, one in each pipeline.

There are numerous problems which must be overcome if one is to successfully design a computer or microprocessor which is capable of executing multiple instructions in parallel. For example, most microprocessors have an instruction set architecture which includes hundreds of individual instructions. Counting all of the different kinds of addressing modes for a given architecture, the total number of possible opcodes is likely to number somewhere in the thousands. Pairing all of the thousands of possible first instructions with all the possible second instructions for a given instruction set could easily result in millions of different combinations. Designing a machine which is capable of executing all of these various combinations is a formidable task. Fortunately, in most computer programs, a relatively small subset of the entire instruction set is used to generate a very high percentage of executable code. For the sake of simplicity, therefore, it is desirable to define a manageable set of instruction pairs that may be executed in parallel and to design the instruction pipelines accordingly. Pairs of instructions that are not members of the defined set must be executed sequentially.

Another problem confronting the designer of a superscalar machine is guaranteeing that the effect of parallel execution of instructions on the machine state visible to the programmer is the same as for sequential execution of the same set of instructions in a single pipeline. Unless this transparency can be guaranteed, code written for a conventional single pipeline microprocessor may not execute as desired in the superscalar machine.

One approach to this problem is to require that only independent instructions be permitted to enter the parallel pipelines simultaneously. A pair of instructions are "independent" if the execution of the second instruction in the pair does not utilize any machine resources that might be modified by execution of the first instruction in the pair. Potential dependencies between successive instructions include those involving general purpose registers, stack pointers, memory locations and flags. If successive instructions are not independent, they must be executed sequentially. This forgoes some of the performance increase theoretically possible with a superscalar design, but insures that code will execute reliably.

As will be seen, the present invention provides a method and apparatus for insuring that there are no dependencies between a pair of instructions that are presented for parallel execution in a superscalar machine.

SUMMARY OF THE INVENTION

The present invention is incorporated in a superscalar processor capable of executing two integer instructions in parallel. An array of comparators is provided to check for all combinations of register dependency between a pair of sequential program instructions. Additional logic is provided to validate the register fields of the instructions. If no impermissible dependencies are detected and all register fields are valid, the instructions are issued and executed in parallel. Otherwise, the instructions are executed sequentially.

DETAILED DESCRIPTION OF THE INVENTION

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

The invention described herein is embodied in a microprocessor hereinafter referred to as the P5 microprocessor which is manufactured by Intel Corporation, the assignee of this application. The P5 is a superscalar microprocessor of degree two having dual instruction pipelines and is generally an improved version of Intel's popular Intel 486 TM microprocessor. Details of the architecture and instruction set of the Intel 486 TM microprocessor are described in numerous publications widely disseminated to those in the art. (Intel and 486 are trademarks of Intel Corporation.) Although frequent reference will be made to the P5 architecture in the specification, and examples will be provided in the context of instructions used by Intel's family of microprocessors, including the Intel 486 TM, it is to be understood that the present invention is not limited to these specific machines.

Figure 1:
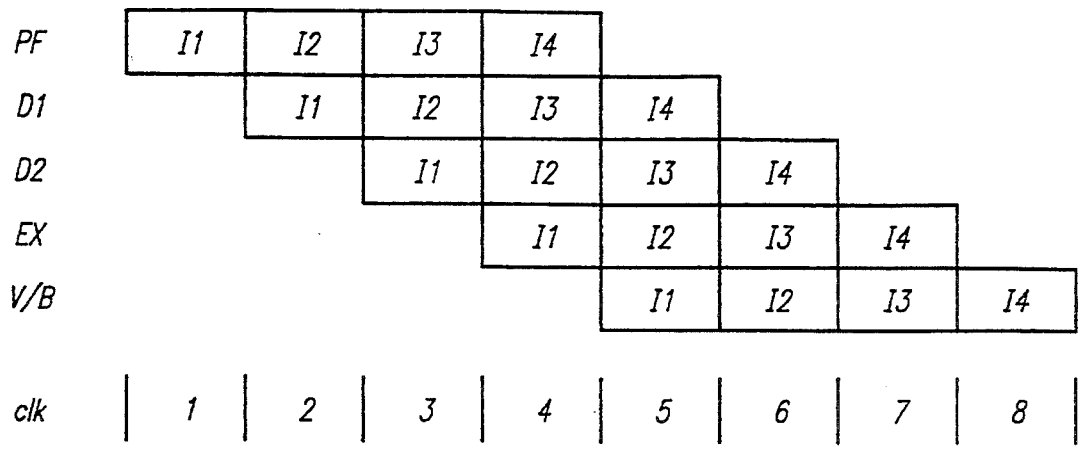
FIG. 1 illustrates the central processing unit pipeline execution structure of a prior art microprocessor.

With reference to FIG. 1, a prior art pipeline structure of the Intel 486 TM microprocessor is illustrated in which the stages of the instruction are denoted by the entries along the left-hand column. The clock time intervals between instruction steps are illustrated by the horizontal numbers. Each step in the pipeline is referred to as a clock cycle or machine cycle.

The first stage of the pipeline is the "PF" stage, which denotes the prefetch portion of the pipeline. In this stage, instructions are prefetched from an on-chip cache memory. The next pipe stage is denoted "D1". In this pipeline stage instructions are decoded and issued. The D2 stage is an address computation stage. Note that in accordance with pipeline principles, while the first instruction (e.g., I1) is being executed in the D1 stage of the second clock cycle, a second instruction (e.g., I2) begins executing its prefetched stage. The "EX" stage of the pipeline indicates the execution of the instruction in hardware, while the "WB" stage denotes a writeback operation. Note that in the prior art structure of FIG. 1, only a single instruction is executed in the pipeline for any given clock cycle.

As discussed earlier, the present invention relates to a superscalar machine, which is capable of executing two instructions in parallel during a single clock cycle. To accomplish this the P5 processor contains two integer pipelines, each of which is capable of executing instructions in a single clock. These pipelines are referred to as the "u" and "v" pipes. The u-pipe can preferably execute any instruction in the P5 architecture. The v-pipe can execute a subset of "simple" instructions, as defined further below.

Figure 2:
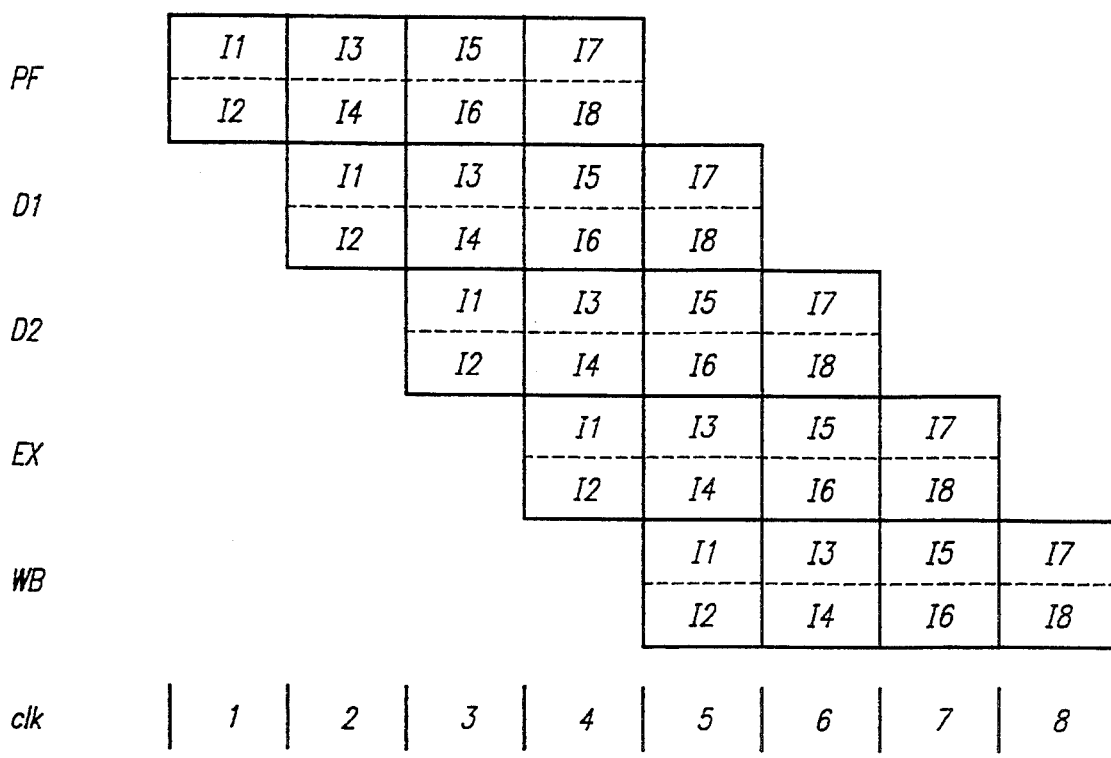
FIG. 2 illustrates the CPU pipeline execution structure of a microprocessor embodying the present invention.

With reference now to FIG. 2, the pipeline structure of the P5 processor is illustrated. Note that in the pipeline sequence of FIG. 2, two instructions, I1 and I2, are shown being executed at each stage of the pipeline in a single clock cycle. Once again, the first stage of the pipeline is the prefetch stage during which time instructions are prefetched from the on-chip cache. Because there are separate caches for instructions and data, prefetches do not conflict with data references for access to the cache, as was the case for prior art CPUs. This means that during the prefetch stage, the instructions I1 and I2 are fetched directly from the instruction cache and loaded into the u and v pipes. In the next pipe stage (i.e., D1) the instructions I1 and I2 are decoded and issued.

As stated earlier, the P5 microprocessor can issue one or two instructions in a single clock cycle. In order to issue two instructions simultaneously, however, both instructions in the pair must satisfy certain conditions. That is, both instructions in the pair must be relatively simple and free of interdependencies.

The process of issuing two instructions in parallel is referred to as "instruction pairing". When instructions are paired, the instruction issued to the v-pipe (second pipe) is always the next sequential instruction after the one issued to the u-pipe. Although the instructions may execute in parallel, the behavior as seen by the programmer is exactly the same as if they were executed sequentially (as would be the case for prior art designs). Subject to constraints on pairing, instructions proceed in parallel through the D2 and EX stages to their completion in the WB stage. During their progression through the pipeline, it is appreciated that instructions may be stalled for any number of reasons. When an instruction in the u-pipe is delayed, for example, then the instruction (if any) issued with it to the v-pipe is also delayed at the same pipeline stage. No successive instructions are allowed to advance to the stalled stage of either pipeline. When an instruction in the v-pipe is stalled, the instruction issued with it in the u-pipe is allowed to advance, while the v-pipe is stalled. No successive instructions are allowed to advance to the stalled stage of either pipeline.

In general, pairs of simple instructions may be paired as long as there are no dependencies between them. To issue two integer instructions simultaneously, certain conditions have to be satisfied. First, both instructions must belong to a predetermined subset of the P5 instruction set. The instruction subset for pairing of integer instructions is shown below in Table 1.

TABLE 1

| Integer Instruction Subset For Pairing | | | | | |
|---|---|---|---|---|---|
| u-pipe instructions | | | v-pipe instructions | | |
| mov r, r | alu r, i | push r | mov r, r | alu r, i | push r |
| mov r, m | alu m, i | push i | mov r, m | alu m, i | push i |
| mov m, r | alu eax, i | pop r | mov m, r | alu eax, i | pop r |
| mov r, i | alu m, r | nop | mov r, i | alu m, r | jmp near |
| mov m, i | alu r, m | | mov m, i | alu r, m | jcc near |
| mov eax, m | inc/dec r | | mov eax, m | inc/dec r | OF jcc |
| mov m, eax | inc/dec m | | mov m, eax | inc/dec m | call near |
| alu r, r | lea r, m | | alu r, r | lea r, m | nop |

(Note that in Table 1, the entry "alu r,r" denotes a class of instructions that comprise such instructions as "add," "or," "adc," "sbb," "and," xor," "cmp".)

Constraining instruction pairs to members of the subsets defined in Table 1 radically reduces the number of possible combinations of different instructions that would have to be handled during parallel execution. This implementation recognizes that there is a relatively small subset of instructions (approximately twenty) which account for nearly 95% of all the instructions executed by typical software. A collection of the most frequently used instructions are those listed in Table 1 above. The use of subsetting means that the dual instruction decoder need not operate on the complete instruction set. Rather, its design can be simplified to greatly improve the timing relationships involved and to economize on the use of silicon area. Use of subsetting also allows the machine to quickly identify the two instructions, decode them rapidly, and then execute them in parallel.

Figure 3:
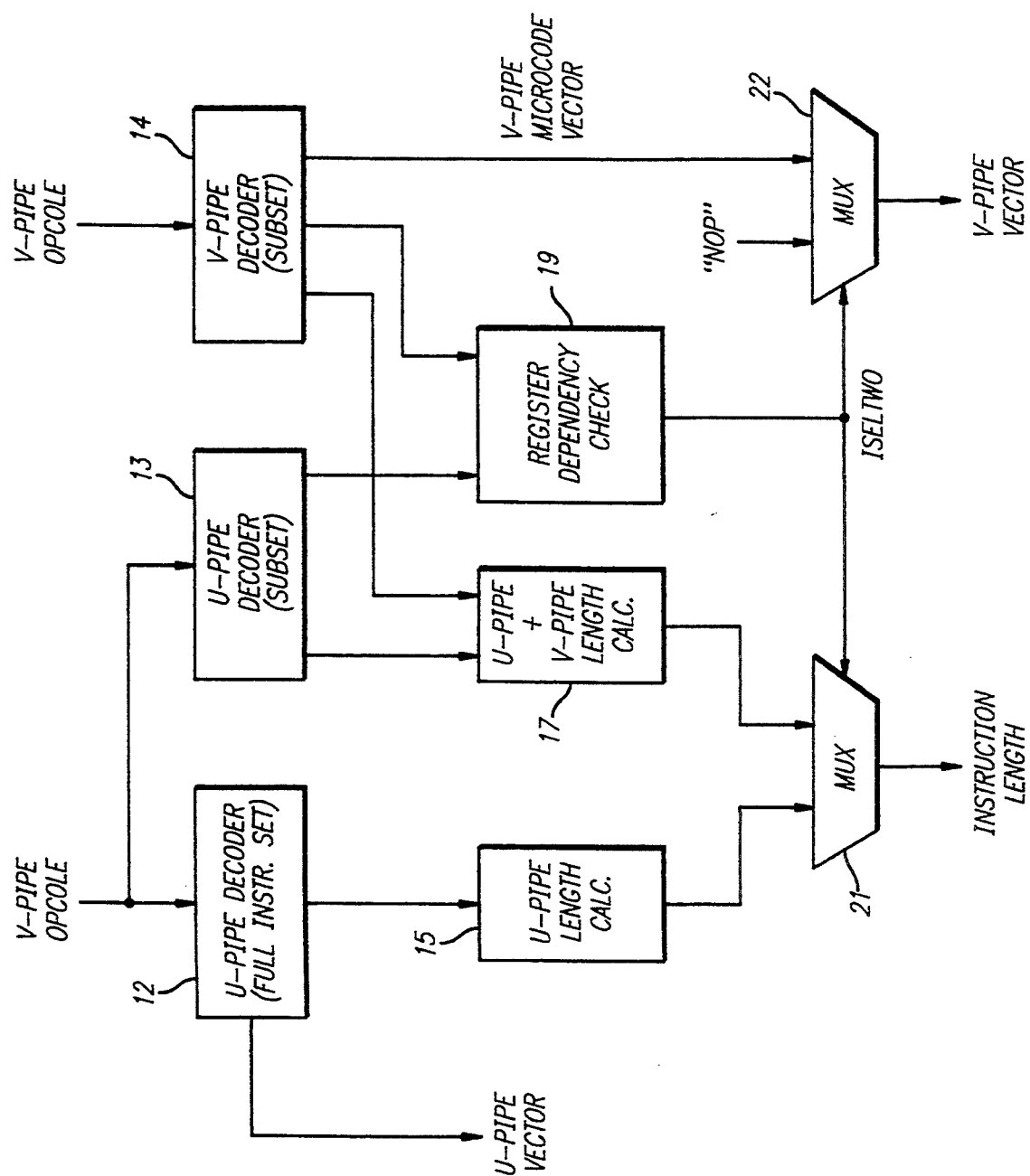
FIG. 3 is a functional block diagram of the dual instruction decoder apparatus incorporated within the present invention.

With reference now to FIG. 3 there is shown a block diagram of the dual instruction decoder of the P5. In FIG. 3, the u-pipe opcode and v-pipe opcode are coupled to decoders 12 and 14, respectively. In addition to being coupled to decoder 12, the u-pipe opcode is also coupled to an additional decoder 13. Decoders 12, 13 and 14 comprise ordinary programmable logic arrays (PLAs) which do all the decoding of the instructions. For example, decoder 12 generates the first vector of microcode for the u-pipe instruction, while decoder 14 has a similar PLA that decodes the first vector of microcode for the v-pipe instruction. Each of the microcode vectors comprise fields which contain information such as the source register location, the destination register, ALU operation information, address computation, and displacement immediate.

The decoder of FIG. 3 is divided into two sections or paths. One path (the u-pipe) is capable of handling all instructions in the instruction set, while the other path (the v-pipe) is aimed specifically at handling a second instruction in parallel. If the conditions for parallel execution of instruction pairs are not met, instructions are executed sequentially in the u-pipe as in prior art processors, particularly the Intel 486 ™.

With continuing reference to FIG. 3, the two pipes are very similar except for the fact that the u-pipe functions as the default pipeline when superscalar conditions are not met. This means that the u-pipe path in FIG. 3 is capable of executing all instructions in the instruction set, whereas the v-pipe need execute only a subset of the full instruction set. For example, decoders 13 and 14 are specifically designed to decode only a subset of the full instruction set. On the other hand, decoder 12 is capable of decoding the full instruction set when the machine defaults to one instruction per clock cycle. For any pair of instructions, the u-pipe always processes the first instruction in sequence of the pair and the v-pipe always processes the second instruction of the pair.

As will be more fully described below, register dependency checking is performed by unit 19 which receives outputs from decoders 13 and 14. The outputs of decoders 13 and 14 (which are coupled to unit 19) include information which indicates the destination register of the current instruction. Logic in unit 19 determines whether a dependency exists in the destination register for each instruction by identifying the destination register of the u-pipe and ensuring that it is not used in the v-pipe instruction. At the same time that the register dependency check is being performed, there is also a length calculation which is performed by unit 17. In other words, unit 17 calculates the length of the pair of instructions, i.e. the sum of the u-pipe plus the v-pipe instructions. Unit 15 only calculates the length of the u-pipe instruction.

Conceptually, the outputs of units 15 and 17 are coupled to a multiplexer 21 which outputs the instruction's length. Multiplexer 21 is controlled by a signal ISELTWO which provides basic "issue one/issue two" information output from register dependency check unit 19. The signal ISELTWO is the same signal that is used to conditionally execute the v-pipe instruction by controlling MUX 22. When register dependency check unit 19 determines that only one instruction can be executed, MUX 21 is controlled such that the instruction length is whatever the length of the u-pipe vector is. In the v-pipe, when only one instruction is issued, the control signal ISELTWO selects no operation ("NOP") to be output by MUX 22. For such a situation the length comes solely from the u-pipe.

When there is no register dependency, two instructions can be executed in parallel. For this condition, the instruction length output by MUX 21 is selected to be the same as the length calculation of the u and v-pipes together (i.e. the output of unit 17). For this condition, the machine essentially sees the pair as one large instruction. When two instructions are executed in paralle, MUX 22 simply passes the u-pipe microcode vector through to the output of MUX 22. The information at the output of MUXs 21 and 22 is coupled to the execution engine of the microprocessor. The execution engine normally comprises the address computation unit, the arithmetic logic unit (ALU), data paths, register files, etc.

It should be emphasized that all the operations performed by the dual instruction decoder of FIG. 3 are done within one clock cycle. That is, the optodes are coupled to the inputs of the upper decoders and the vectors are provided by the multiplexing units all within a single clock cycle.

As mentioned above, instructions may be executed in parallel only if there are no interdependencies between them. There are basically four mechanisms by which there may be dependency between two instructions. These are: use of the same general purpose register by both instructions; modification of the stack pointer by the first instruction; references by both instructions to the same memory location; and modification by the first instruction of a flag used by the second instruction. For each of these categories of dependency, special logic is implemented in the P5 processor to either obviate the effects of such dependency or to check for the dependency and cause the tentatively paired instructions to be executed serially if the dependency is detected.

The first of the above-identified categories of dependency is register dependency, which is dealt with by checking for the existence of such a dependency and causing the v-pipe instruction to be redirected to the u-pipe if a dependency is detected. The basic rule behind register dependency checking is that the destination register of the u-pipe instruction cannot be used as a source, destination or address (base or index) component of the v-pipe instruction. This requirement holds for both explicit and implicit use of a register for the instructions. For purposes of dependency checking, using any part of a 32-bit register is treated the same as using the entire register. The dependency checking process is simplified by pairing only single microcode vector instructions since it is always possible to identify the destination register of a single vector instruction.

The instruction decoders for the u and v-pipes generate the following signals which are used by the dependency checking logic:

TABLE 2

| Signal | Description |
| --- | --- |
| iureg | provides the encoding of any register used as a destination in the first instruction of a pair (u-pipe) |
| iurvid | register field in iureg [2:0] is valid |
| iustkp | u-pipe instruction is implicitly modifying the stack (ESP) |
| vopc20 | v-pipe instruction has a valid register field in bits [2:0] of the first opcode byte |
| vmdm20 | v-pipe instruction has a valid register field in bits [2:0] of the second opcode byte |
| vmdm53 | v-pipe instruction has a valid register field in bits [5:3] of the second opcode byte |
| li1 & membyt | valid condition for v-pipe base register |
| li2 & membyt | valid condition for v-pipe index register |
| vacc | v-pipe instruction is implicitly using the accumulator (EAX) |
| vstk | v-pipe instruction is implicitly modifying the stack (ESP) |

Table 3 below illustrates the potential dependencies between the instructions in the u and v-pipes that must be checked in order for the instructions to be paired. Each cell containing a "Y" indicates a dependency that must be checked, whereas the cells containing an "N" indicate checks that are not required. Checking iustkp with vacc is not required since the former indicates an implicit modification of the stack pointer (ESP), whereas the latter indicates an implicit modification of the accumulator (EAX). Thus there is no dependency even if both signals are set. In addition, checking iustkp with vstk is not required since special hardware is provided in the addressing and segmentation unit of the P5 processor to keep track of any modifications to the stack pointer. This allows parallel execution of instructions that implicitly modify the stack pointer, e.g., "push" and "pop" instructions.

TABLE 3

| u-pipe instr | Register Field | | | Base Register (ivbase) | Index Register (ivindex) | vacc | vstk |
| --- | --- | --- | --- | --- | --- | --- | --- |
| | [2:0] | [10:8] | [13:11] | [2:0] | [2:0] | | |
| iureg [2:0] | Y | Y | Y | Y | Y | Y | Y |
| justkp | Y | Y | Y | Y | Y | N | N |

Figure 4:
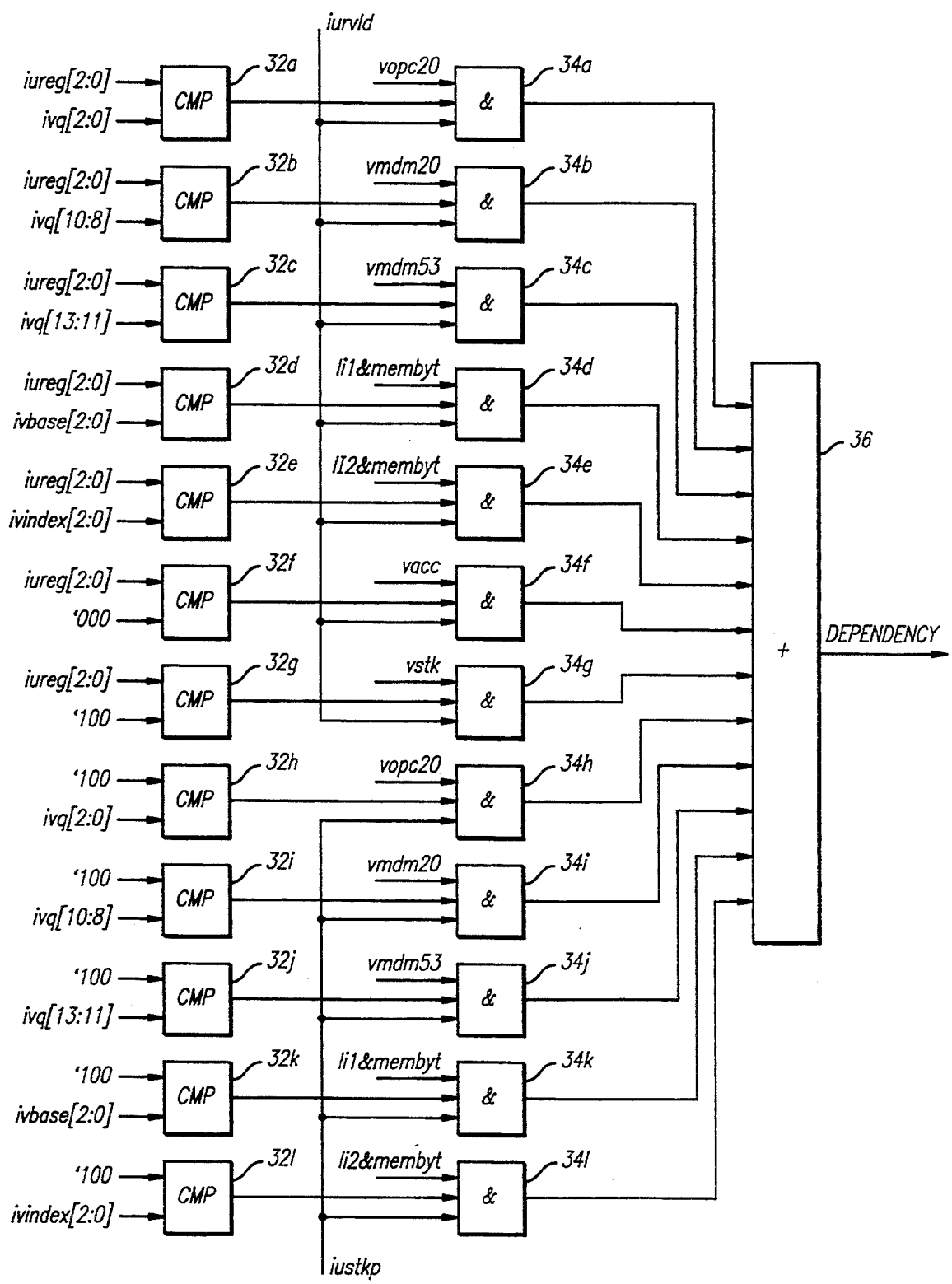
FIG. 4 is a functional block diagram of the register dependency checking circuitry of the present invention.

FIG. 4 shows the implementation of the dependency checking logic in accordance with Table 3. Note that '000 is the encoding for the accumulator (EAX) and '100 is the encoding for the stack pointer (ESP). The dependency checking logic is basically a three-level structure of comparators 32a-l, AND gates 34a-l and an OR gate 36. The comparators compare each of the different combinations of fields shown in Table 3. For example comparator 32a implements the comparison of iureg[2:0] and bits [2:0] of the v-pipe register field as shown in the first cell of Table 3.

The comparator outputs are validated by the array of AND gates 34a-l using the signals defined in Table 2 above. If any of one of the AND gate conditions is true, a register dependency between the u-pipe and v-pipe instructions is detected and the output of OR gate 36 is high. This signal is applied to pipeline control logic so that if a dependency is detected, the u and v-pipe instructions are not paired and the v-pipe contents are ignored.

Another type of potential dependency between instructions relates to memory references. The P5 data cache can support a continuous rate of two data references per clock, one from each of the two integer pipelines. However, since the data cache is single ported, accesses by the two pipelines to the same location must be serialized. Such address collisions are detected during the instruction execute (EX) stage of the pipeline by comparators associated with the data cache. Address collision between a u-pipe access and a v-pipe access is determined by examining bits [4:2] of the address associated with each access. If these bits are the same, it means that both accesses are to the same bank of the data array and the v-pipe access is "bounced" and repeated in the subsequent clock. This stalls execution of the instruction in the v-pipeline until the cache access is completed.

The final category of potential dependency between instructions involves implicit dependencies via flags that are not explicitly encoded in the instructions. In general, instruction pairings that involve flag dependencies are not allowed. However, an instruction that modifies a flag may be paired with a conditional jump instruction dependent on the same flag since special hardware is provided in the P5 to verify that branches are taken correctly.

To better understand and appreciate the present invention, the following examples illustrate the instruction pairing rules and dependency constraints discussed above. (Note that in the format used, the destination operand is on the left.)

EXAMPLE 1 mov edx, [ebx]
add esi, 4;

In this example, the first instruction in the sequence is a "mov" which will be handled by the u-pipe. The destination register for the u-pipe instruction is edx. Since edx is not used in any manner in the v-pipe "add" instruction, there are no dependencies. Furthermore, both instructions are simple instructions within the instruction subset of Table 1. Therefore, these two instructions may be paired.

During execution, the first instruction opcode (i.e., "mov") is the u-pipe opcode, wherein "add" is the v-pipe opcode. Upper decoder 12 decodes the "mov" instruction and produces a u-pipe vector which specifies that the destination register is edx. The decoder also specifies that a memory read is necessary-wherein the address is specified by ebx. Decoder 12 also identifies the components of the address calculation and determines that it is a one vector macro instruction. At the same time, the subset decoder 13 looks to see whether "mov" is within the subset of the instructions that are eligible for dual issuance. Decoder 13 also identifies the destination register edx which will be used by register dependency checking unit 19. Unit 19 will check edx versus esi and conclude that they are not the same.

On the v-pipeline side, the v-pipe decoder 14 looks at add esi and identifies esi as the destination register (for this example, esi is also the source). Decoder 14 also identifies the immediate component (i.e., 4), and then unit 17 computes the length of the two instructions. The "add" instruction then proceeds down the v-pipe. Thus, because both instructions are simple and there are no dependencies between them, these two instructions may be paired.

Example 2 mov edx; [ebx];
add edx, 4;

In this example, the destination register for the u-pipe instruction is edx. Since this destination register is also used in the v-pipe instruction, the dependency checking logic determines that this pair of instructions cannot be issued in parallel. For this case, the u-pipe instruction is issued first, while the v-pipe path remains idle (i.e., v-pipe issues a "NOP"). In the following clock cycle, the "add" instruction is executed in the u-pipe. It should be understood that the add instruction issued in the u-pipe during the next clock cycle may possibly be issued in parallel with whatever instruction follows it in the sequence, subject to the pairing rules and dependency checks.

Example 3 mov al, 4;
mov ah, 7;

In this example, both instructions are simple instructions and there is no true dependency since al and ah are separate register locations. However, the instruction decoder considers al and ah to be part of the same register since they are both within the same 32-bit register. These instructions are therefore executed sequentially in the u-pipe.

Example 4 cmp edx, 0;
jnz loop;

In this example there is an implicit dependency on the Z flag. However, the P5 processor includes special branch verification logic to check that the jump instruction is correctly taken and to flush the pipeline if it is not. Therefore, despite the implicit dependency, these instructions are allowed to be issued and executed in parallel.

Example 5 push esi;
call near routinex

Here again, there is an implicit dependency, this time on the stack pointer. As discussed above, special hardware in the address generation unit allows these two instructions to be executed in parallel.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

We claim:

1. A microprocessor comprising:
   (a) a first instruction pipeline for executing a first instruction, said first instruction being a member of an instruction set;
   (b) a second instruction pipeline for executing in a first clock cycle a second instruction in parallel with execution of the first instruction, said second instruction being a member of a subset of said instruction set;
   (c) an apparatus for pairing the first and second instructions for parallel execution comprising:
      (i) a plurality of comparators for comparing a destination register of the first instruction with each register used to execute the second instruction, each of said plurality of comparators having a respective output;
      (ii) a plurality of AND gates, each of said AND gates receiving a first input from a corresponding one of the comparator outputs and a second input indicating that a valid register field is identified in one of the first and second instructions, each of said AND gates having a respective output;
      (iii) an OR gate receiving as inputs all of the outputs of said AND gates, said OR gate having an output;
   (d) pipeline control logic coupled to the output of said OR gate for enabling parallel execution of the first and second instructions in said first clock cycle if and only if conditions for parallel execution of instruction pairs are met, said conditions for parallel execution of instruction pairs being (1) the destination register of the first instruction is different from all of the registers used to execute the second instruction and (2) all register fields identified in the first and second instructions are valid, wherein, when said conditions for parallel execution of instruction pairs are not met, only said first instruction is executed in said first clock cycle and said microprocessor executes said second instruction in parallel with a third instruction during a second clock cycle following said first clock cycle if said second and third instructions meet said conditions for parallel execution of instruction pairs.

2. The microprocessor of claim 1, wherein said registers used to execute the second instruction includes a source register and a destination register.

3. The microprocessor of claim 1, wherein said first instruction pipeline can execute all instructions in said instruction set, and wherein said second instruction pipeline cannot execute all instructions in said instruction set and can execute only the instructions in the subset of the instruction set.

* * * * *

UNITED STATES PATENT AND TRADEMARK OFFICE
CERTIFICATE OF CORRECTION

PATENT NO.   : 5,416,913
DATED        : May 16, 1995
INVENTOR(S)  : Grochowski et al.

It is certified that error appears in the above-identified patent and that said Letters Patent is hereby corrected as shown below:

In column 5 at line 62 delete "optodes" and insert --opcodes--

In column 6 at line 37 delete "iurvid" and insert --iurvld--

In column 7 at line 9 delete "justkp" and insert --iustkp--

Signed and Sealed this

Thirteenth Day of August, 1996

Attest:

BRUCE LEHMAN

Attesting Officer

Commissioner of Patents and Trademarks